United States Patent [19]

Shimano

[11] 4,403,787
[45] Sep. 13, 1983

[54] COVERING APPARATUS FOR A HANDLE BAR OF A BICYCLE

[75] Inventor: Keizo Shimano, Sakai, Japan

[73] Assignee: Shimano Industrial Company Limited, Osaka, Japan

[21] Appl. No.: 275,665

[22] Filed: Jun. 22, 1981

[30] Foreign Application Priority Data

Jun. 27, 1980 [JP] Japan ............................. 55-91243[U]

[51] Int. Cl.³ ............................................... B62K 21/26
[52] U.S. Cl. ............................ 280/289 H; 74/551.9
[58] Field of Search .......... 280/289 G, 289 H, 289 R; 74/558, 551.8, 551.9, 558.5

[56] References Cited

U.S. PATENT DOCUMENTS

| 571,025 | 11/1896 | Spamer | 74/551.8 |
| 2,212,169 | 8/1940 | Rendle | 74/558 |
| 3,645,151 | 2/1972 | Yoshikawa | 74/551.9 |
| 4,105,220 | 8/1978 | Pacific | 280/289 H |

FOREIGN PATENT DOCUMENTS

| 74518 | 1/1945 | Austria | 74/558.5 |
| 2716449 | 10/1978 | Fed. Rep. of Germany | 74/558 |
| 1028059 | 5/1953 | France | 74/551.9 |
| 2326324 | 4/1977 | France | 74/551.9 |
| 219469 | 7/1924 | United Kingdom | 74/551.9 |

Primary Examiner—Joseph F. Peters, Jr.
Assistant Examiner—Ross Weaver
Attorney, Agent, or Firm—Stevens, Davis, Miller & Mosher

[57] ABSTRACT

A covering apparatus for a handle bar of a bicycle, comprising a body formed of a synthetic resin foam and having a hollow into which the handle bar is insertable, the body being provided at one side thereof with an open groove through which the hollow is open to the body exterior, and a stopper provided within the groove for closing the open groove.

5 Claims, 4 Drawing Figures

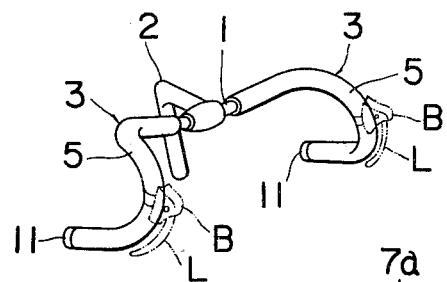
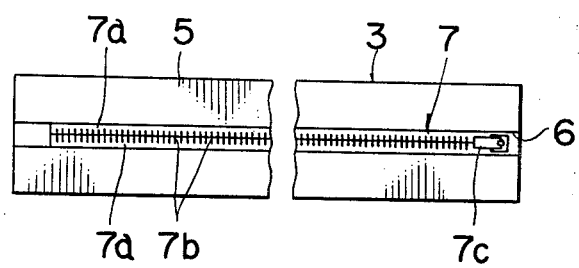
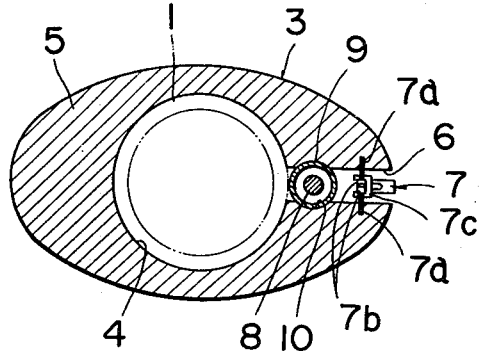
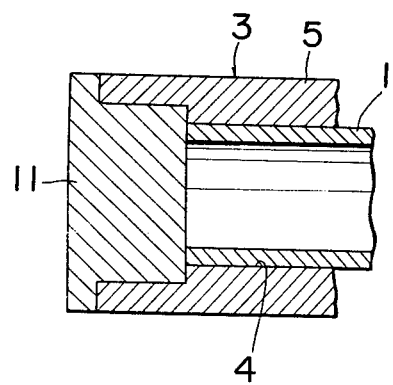

COVERING APPARATUS FOR A HANDLE BAR OF A BICYCLE

FIELD OF THE INVENTION

This invention relates to a covering apparatus for a handle bar of a bicycle. The types of handle bars to which the invention pertains include a drop-type handle bar, a flat handle bar and an upwardly directed handle bar.

BACKGROUND OF THE INVENTION

Generally, a handle bar for a bicycle is formed of a metallic pipe. If uncovered, a driver, when gripping the handle bar, often feels a cold or hard pipe which is uncomfortable, or his hands may to slip along the pipe. Accordingly, a the handle bar, especially a drop-type handle bar, is usually wound with a tape of cloth or the like. Since the driver may grip the drop-type handle bar at a plurality of portions along its straight and bent portions, the tape is wound along the entire length of the handle bar.

An application of tape, however, is troublesome and takes much time and its replacement also takes much time because its removal from the handle bar is very difficult.

SUMMARY OF THE INVENTION

An object of the invention is to provide an elastic covering apparatus for the handle bar, which allows the driver, when gripping the handle bar, to feel comfortable, and cushions an impact to him even if hit by the handle bar when the bicycle happens to collide, thereby protecting the covering apparatus is also simply and quickly attached to the handle bar.

Another object of the invention is to provide a covering apparatus for the handle bar, which has a decreased air resistance against the bicycle's running.

In detail, the covering apparatus of the invention has a body having a hollow into which the handle bar of the bicycle is insertable and is formed of a synthetic resin foam, the body being provided at one side thereof with a groove through which the hollow opens to the exterior, so that the body can be sleeved onto the handle bar through the open groove. A stopper is provided across the groove for closing the groove.

The covering apparatus of the invention can be sleeved onto the handle bar simply and quickly by forcibly inserting the body sideways onto the handle bar, thereby solving the problems associated with winding a tape on the handle bar as previously described.

Since the body is formed of a synthetic foam resin, the covering apparatus is superior in tightness and is stable in attachment, and also has an improved touch to allow the driver to feel a soft and resilient covering which fits well in his hand as compared with covering apparatus in comparison with the case that he directly the metallic handle bar, so that his hand never slips while driving the bicycle.

Furthermore, even when the bicycle happens to collide and the driver is hit at his body by the handle bar, the cover body cushions the impact to protect him.

The body of the covering apparatus of the invention is formed will an approximately elliptic shape including an elliptic or streamlined shape, in cross section, thereby reducing the aforesaid air resistance. Also, an insertion bore for a control cable connected to a control lever mounted on the handle bar is provided at the body, whereby the cable can extend along the handle bar, and can considerably reduce the air resistance in comparison with the conventional cable which extends largely outwardly, and prevent the cable from being caught by a foreign object.

These and other objects of the invention will become more apparent in the detailed description and examples which follow:

BRIEF DESCRIPTION OF THE DRAWINGS

FIG. 1 is a perspective view of a covering apparatus of the invention, which is applied to a drop-type bicycle handle bar, FIG. 2 is a partially omitted front view of the covering apparatus, FIG. 3 is an enlarged longitudinal sectional view thereof, and FIG. 4 is an enlarged longitudinal sectional view of an end of the covering apparatus.

DETAILED DESCRIPTION OF THE INVENTION

The drop-type handle bar in FIG. 1 comprises a handle bar 1 comprising a horizontal portion and bent portions curved forwardly from both sides of the horizontal portion and bending rearwardly at front ends, and a handle stem 2 joined to the lengthwise center of bar 1.

A covering apparatus of the invention generally designated by reference numeral 3 in FIG. 1 is mounted on the handle bar 1 and is constructed as follows:

A body 5 having a hollow 4, into which the handle bar 1 is insertable, is formed of a synthetic resin foam, such as foaming urethane or foaming styrene and is provided at one side with a groove 6 through which the hollow 4 is open to the exterior, the groove 6 having therein a stopper 7 for closing the groove 6.

The open groove 6 is provided throughout the length of body 5 and has a width considerably smaller than an outer diameter of handle bar 1, but sufficient to permit the handle bar 1 to be inserted into the hollow 4 through the groove 6. In other words, the body 5 of synthetic resin foam is elastically deformable due to its softness. Since, if the amount of the elastic deformation is too large, the driver's grip on the handle bar 1 may be unstable during the driving of the bicycle, the amount of elastic deformation is properly set to an extent such that the cover body 5 fit to his hand. In other words, the width of groove 6 is within the limit of elastic deformation of body 5 and is sufficient to permit insertion of insert the handle bar 1 therein.

The body 5 in the shown embodiment has a major axis and a minor axis intercrossing perpendicularly to each other and is formed in a line-symmetrical ellipse in cross section, the major axis being directed longitudinally of the bicycle, so that the air resistance against the bicycle's running is reduced. Alternatively, the body 5 may, in cross section, be line-symmetrical only with respect to the major axis and not-symmetrical to the minor axis, thereby being formed in a streamlined shape.

Between the open groove 6 at the body 5 is provided an insertion bore 10 for a control cable of a control wire 8 and an outer sheath 9, connected to a control lever L mainly for the brake of a bicycle, the control wire 8 being insertable into the bore 10 by way of the outer sheath 9. The bore 10 is preferably provided in the groove 6, but may be provided at any portion within the body 5.

The insertion bore 10, which is provided in the groove 6, facilitates insertion of the control cable through the bore 10 and a removal of the cable therefrom.

The control cable may alternatively use the control wire 8 only. In either case, the cable which passes through bore 10 is drawn out in the vicinity of the control lever L and connected thereto.

The stopper 7 may be a snap-look type fastener or a male-female type fastener, but is preferably a slide fastener as shown. The slide fastener is provided at both opposite edges of mounting strips 7a with chucks 7b connected or disconnected by sliders 7c. The mounting strips 7a are embedded in the opposite walls of groove 6 when the body is molded.

When the body 5, as shown in FIG. 1, is divided in two at both sides of handle stem 2, the open groove 6 may be open from one end of each body 5 at the handle stem side and terminate before the other end of body 5. The other end of each body 5 has no open groove to thereby close its hollow 4, but the handle bar 1 is insertable into the hollow 4 from the open groove 6 provided at a large part of body 5 and then the body 5 is slidably moved toward the handle stem 2, so that the end of handle bar 1 is fitted into the closed hollow portion, thus mounting the covering apparatus 3 on the handle bar 1.

In the above construction, the body 5, as shown in FIG. 4, may project at the other end from the end of handle bar 1 and a cap 11 may be attached to the other end of body 5.

In this instance, the body 5 and handle bar 1 are closed at the lengthwise ends thereof, thereby preventing the entry of water into the body 5.

Alternatively, the body 5 may be integral with a cover covering a bracket B for a control lever L mounted on the handle bar 1.

The covering apparatus 3 of the invention constructed as foregoing is attached onto the handle bar 1 in such a manner that at first the slide metal fitting 7c at the stopper 7 disconnects the chucks 7b from each other to open the groove 6 and next, the body 5, while the groove 5 is open, is sleeved onto the handle bar 1 and then the fitting 7c connects the chucks 7b to close the groove 6.

As seen from the above, the covering apparatus of the invention is moutable more simply and quickly on the handle bar 1 than a conventional covering apparatus. The body 5 formed of synthetic resin foam is superior in tightness not so as to move when gripped by the driver, whereby the driver's hands are well fit to the cover body 5 without sliding, thus ensuring safe bicycle operation.

While an embodiment of the invention has been shown and described, the invention is not limited to the specific construction thereof, which is merely exemplary of the invention as other embodiments within the scope of the invention will readily occur to those skilled in the art.

What is claimed is:

1. A covering apparatus for a handle bar of a bicycle, comprising:
    a longitudinally extending body having a hollow into which said handle bar is insertable, said body being formed of a resilient material and having at one side thereof an open groove through which said hollow is open to the body exterior, said body having an insertion bore formed therealong on an interior surface thereof for retaining a control cable; and
    a slide fastener arranged within and extending longitudinally along said groove for opening and closing the same, said slide fastener comprising a pair of engaging members extending longitudinally along said groove and a slider means having a control portion for engaging and disengaging said engaging members.

2. A covering apparatus for a handle bar of a bicycle according to claim 1, wherein said body is formed substantially in an elliptic shape in cross section.

3. A covering apparatus for a handle bar of a bicycle according to claim 1, wherein said insertion bore is formed in said open groove.

4. A covering apparatus for a handle bar of a bicycle according to claim 1, wherein said body has at one lengthwise end thereof a cap.

5. A covering apparatus for a handle bar of a bicycle according to claim 1 wherein said resilient material is a synthetic resin foam.

* * * * *